(12) United States Patent
Kuo

(10) Patent No.: US 8,942,525 B2
(45) Date of Patent: Jan. 27, 2015

(54) PHOTOELECTRIC CONVERSION DEVICE AND OPTICAL FIBER COUPLING CONNECTOR

(71) Applicant: Hon Hai Precision Industry Co., Ltd., New Taipei (TW)

(72) Inventor: Chang-Wei Kuo, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/975,390

(22) Filed: Aug. 26, 2013

(65) Prior Publication Data

US 2014/0199025 A1  Jul. 17, 2014

(30) Foreign Application Priority Data

Jan. 17, 2013  (TW) ............... 102101840 A

(51) Int. Cl.
  *G02B 6/36* (2006.01)
  *G02B 6/43* (2006.01)

(52) U.S. Cl.
  CPC .................................... *G02B 6/43* (2013.01)
  USPC .......................................................... 385/33

(58) Field of Classification Search
  USPC .............................. 385/33, 37, 41
  See application file for complete search history.

(56) References Cited

U.S. PATENT DOCUMENTS

| 5,386,488 | A  | * | 1/1995 | Oikawa ........................... 385/92 |
| 6,554,495 | B1 | * | 4/2003 | Zhu et al. ........................ 385/92 |
| 8,636,426 | B2 | * | 1/2014 | Lin et al. ......................... 385/89 |
| 2013/0108224 | A1 | * | 5/2013 | Ishigami et al. ................ 385/89 |
| 2014/0068924 | A1 | * | 3/2014 | Yu et al. ....................... 29/592.1 |
| 2014/0151585 | A1 | * | 6/2014 | Hung ......................... 250/578.1 |
| 2014/0212086 | A1 | * | 7/2014 | Sunaga et al. .................. 385/14 |

* cited by examiner

*Primary Examiner* — Akm Enayet Ullah
(74) *Attorney, Agent, or Firm* — Novak Druce Connolly Bove + Quigg LLP

(57) ABSTRACT

A photoelectric conversion device includes a circuit board, light-emitting modules arranged on the circuit board in a first straight line, light-receiving modules arranged on the circuit board in a second straight line, and an optical coupling module. The optical coupling module includes a first optical surface, a second optical surface perpendicular to the first optical surface, a reflecting surface obliquely relative to the first and second optical surfaces, first converging lenses arranged on the first optical surface in a third straight line, second converging lenses arranged on the first optical surface in a fourth straight line, third converging lenses arranged on the second optical surface in a fifth straight line, and fourth converging lenses arranged on the second optical surface in a sixth straight line. The first to six straight lines are substantially parallel to each other.

15 Claims, 11 Drawing Sheets

US 8,942,525 B2

PHOTOELECTRIC CONVERSION DEVICE AND OPTICAL FIBER COUPLING CONNECTOR

BACKGROUND

1. Technical Field

The present disclosure relates to communication technologies, and particularly to a photoelectric conversion device and an optical fiber coupling connector having the photoelectric conversion device.

2. Description of Related Art

Optical fiber coupling connectors are used in fiber-optic data transmissions. The optical fiber coupling connector typically includes a photoelectric conversion device and a number of optical fibers. The photoelectric conversion device usually includes a circuit board, a number of light-emitting modules, a number of light-receiving modules, and an optical coupling module having a reflecting surface, a number of first converging lenses, and a number of second converging lenses. The light-emitting modules and the light-receiving modules are arranged on the circuit board in a first straight line, which is parallel to the reflecting surface. The first converging lenses are arranged in a second straight line corresponding to the light-emitting modules and the light-receiving modules. The second converging lenses are arranged in a third straight line corresponding to the second converging lenses one-to-one. The optical fibers are arranged in a fourth straight line corresponding to the second converging lenses.

Each of the light-emitting modules, the corresponding first converging lens, the corresponding second converging lens, and the corresponding optical fiber form a light path. Each of the optical fibers, the corresponding second converging lens, the corresponding first converging lens, and the corresponding light-receiving module also form a light path. In order to increase the number of paths for light, the number of light-emitting modules and the number of light-receiving modules need to be increased along the first straight line. Accordingly, the number of first converging lens needs to be increased along the second straight line, the number of second converging lens needs to be increased along the third straight line, and the number of optical fibers needs to be increased in the fourth straight line. This will simply the overall area of the optical fiber coupling connector.

Therefore, it is desirable to provide a photoelectric conversion device and an optical fiber coupling connector having the photoelectric conversion device, which can overcome or at least alleviate the limitations described.

DETAILED DESCRIPTION

Figure 1:
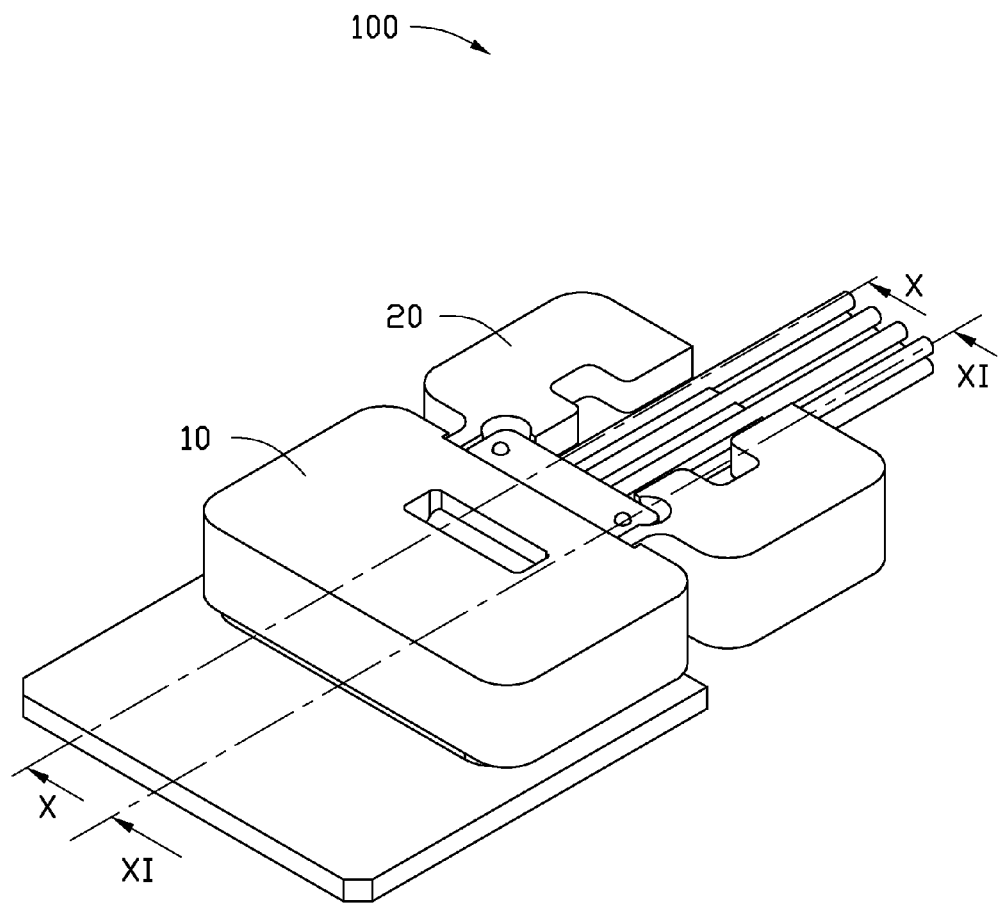
FIG. 1 is a schematic, isometric view of an optical fiber coupling connector including a photoelectric conversion device and an optical fiber assembly, according to an exemplary embodiment.

FIG. 1 shows an optical fiber coupling connector 100 according to an exemplary embodiment. The optical fiber coupling connector 100 includes a photoelectric conversion device 10 and an optical fiber assembly 20. The optical fiber assembly 20 is optically coupled with the photoelectric conversion device 10.

Figure 2:
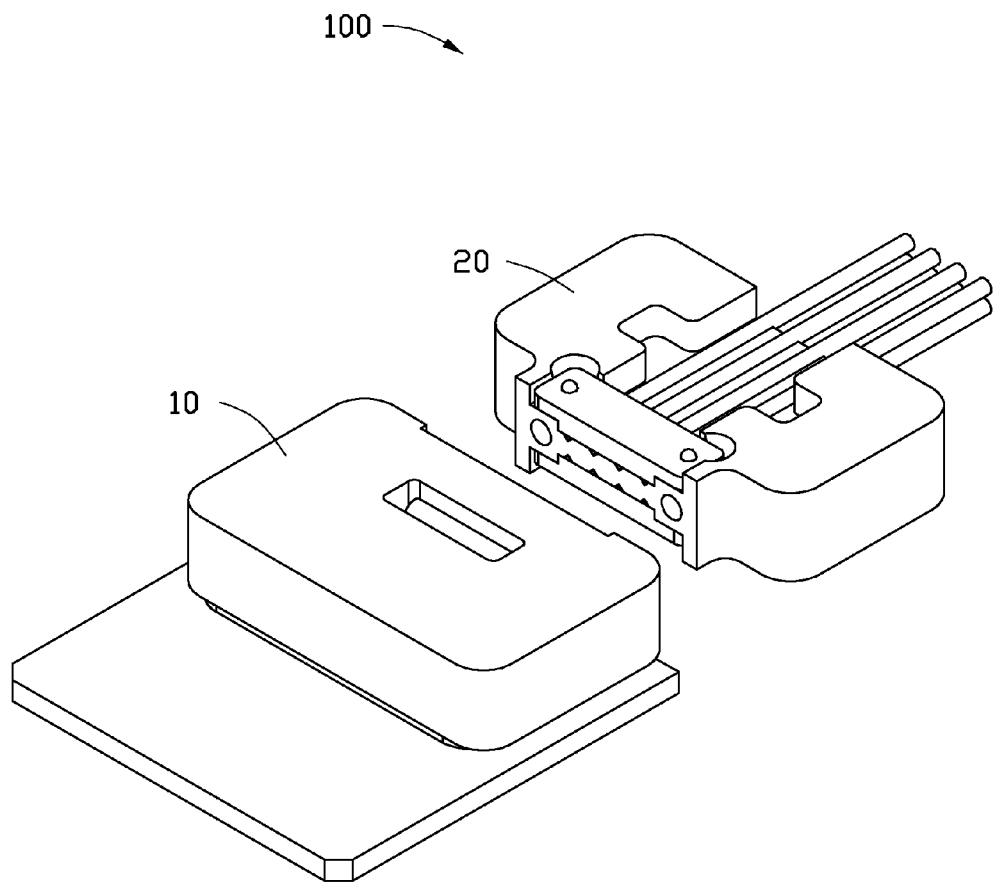
FIG. 2 is an exploded view of the optical fiber coupling connector of FIG. 1.
Figure 3:
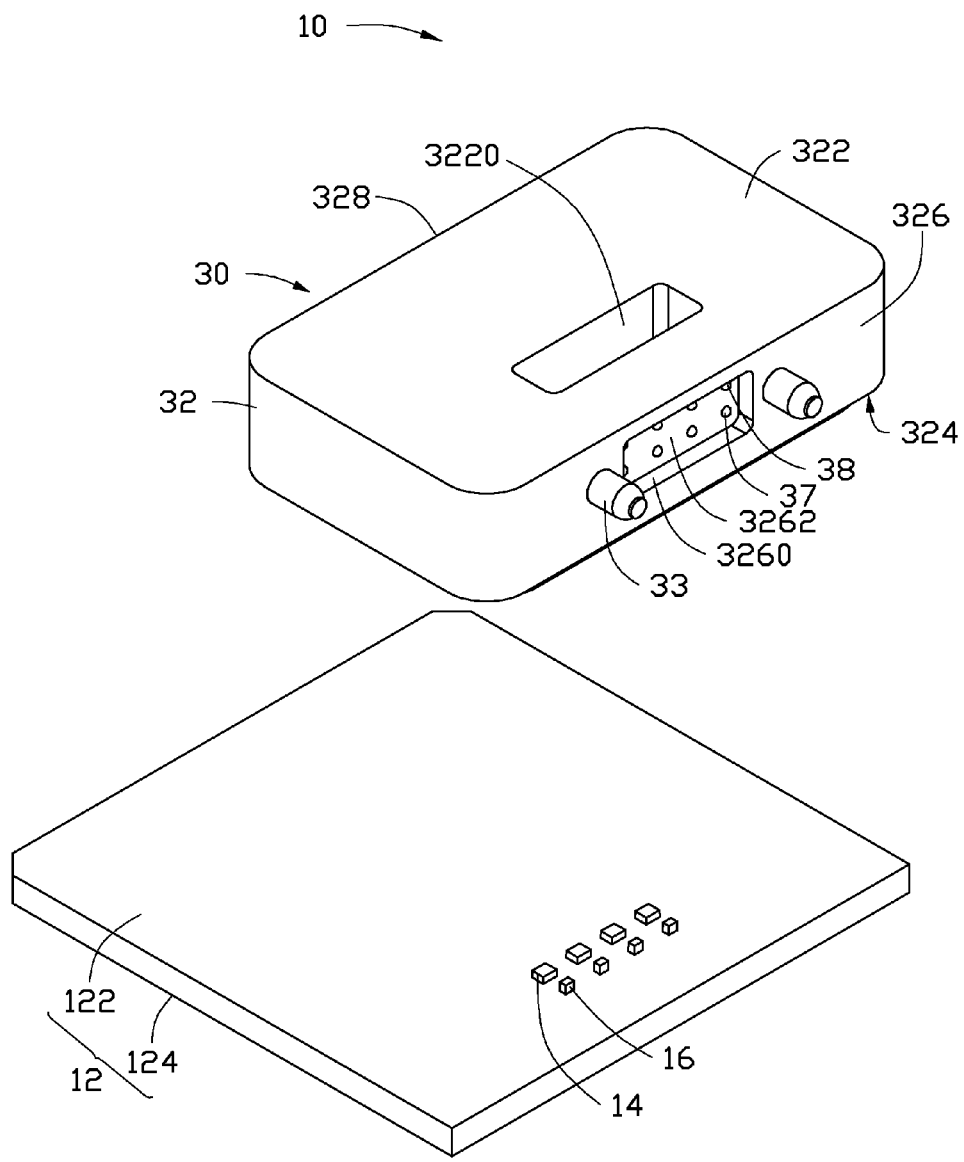
FIG. 3 is an exploded view of the photoelectric conversion device of FIG. 1.

FIGS. 2-3 show that the photoelectric conversion device 10 includes a circuit board 12, four light-emitting modules 14, four light-receiving modules 16, and an optical coupling module 30.

The circuit board 12 includes an upper surface 122 and a lower surface 124. The upper surface 122 and the lower surface 124 are positioned at opposite sides of the circuit board 12 and are substantially parallel to each other.

The four light-emitting modules 14 and the four light-receiving modules 16 are arranged on the upper surface 122 and are electrically connected to the circuit board 12. In detail, the four light-emitting modules 14 are arranged in a first straight line. The light-receiving modules 16 are arranged in a second straight line. The first straight line is substantially parallel to the second straight line. In this embodiment, each of the light-emitting modules 14 is a vertical cavity surface emitting laser (VCSEL) diode and is configured for converting electrical signals to optical signals and emitting light beams. Each of the light-receiving modules 16 is a photo diode and is configured for receiving light beams and converting optical signals to electrical signals.

Figure 4:
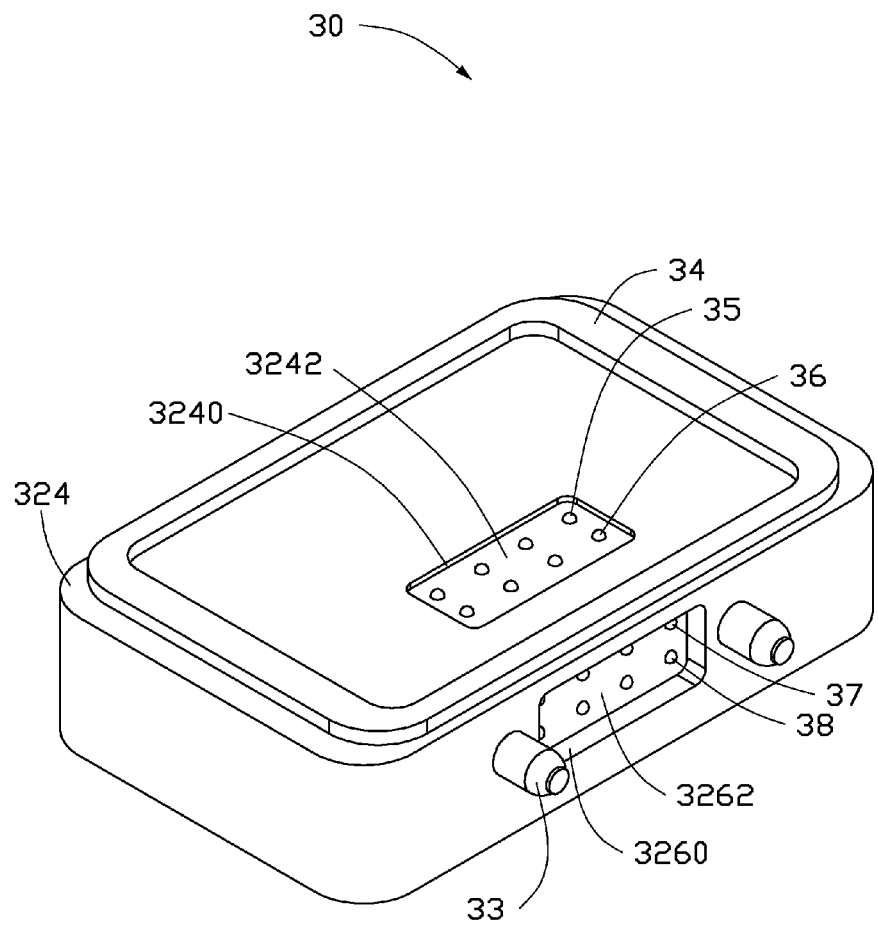
FIG. 4 is a schematic, isometric view of an optical coupling module of the photoelectric conversion device of FIG. 3.
Figure 10:
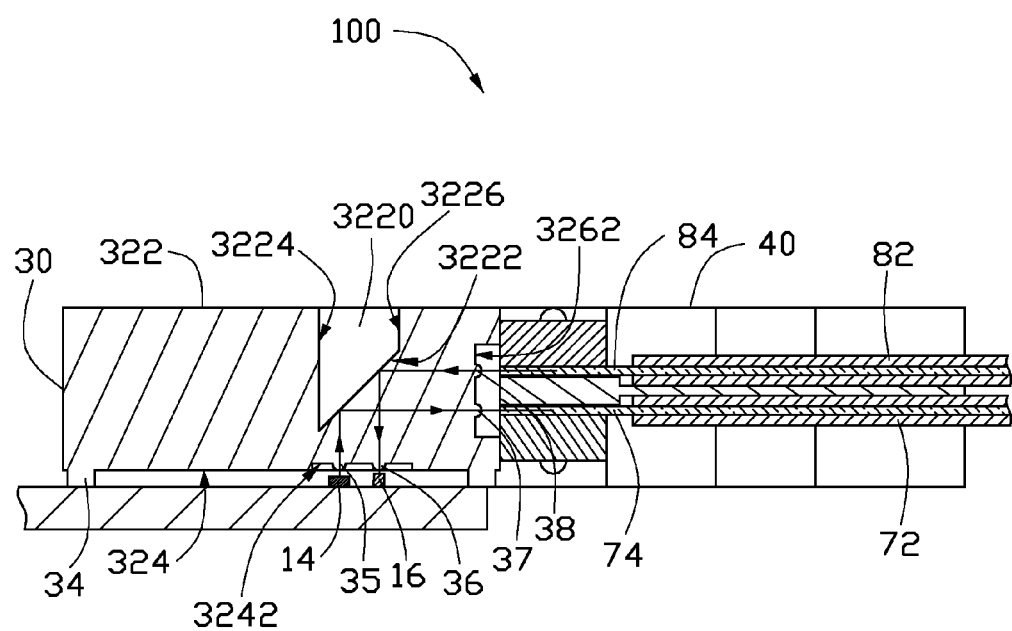
FIG. 10 is a cross-sectional view of the optical fiber coupling connector of FIG. 1, taken along the line X-X of FIG. 1.
Figure 11:
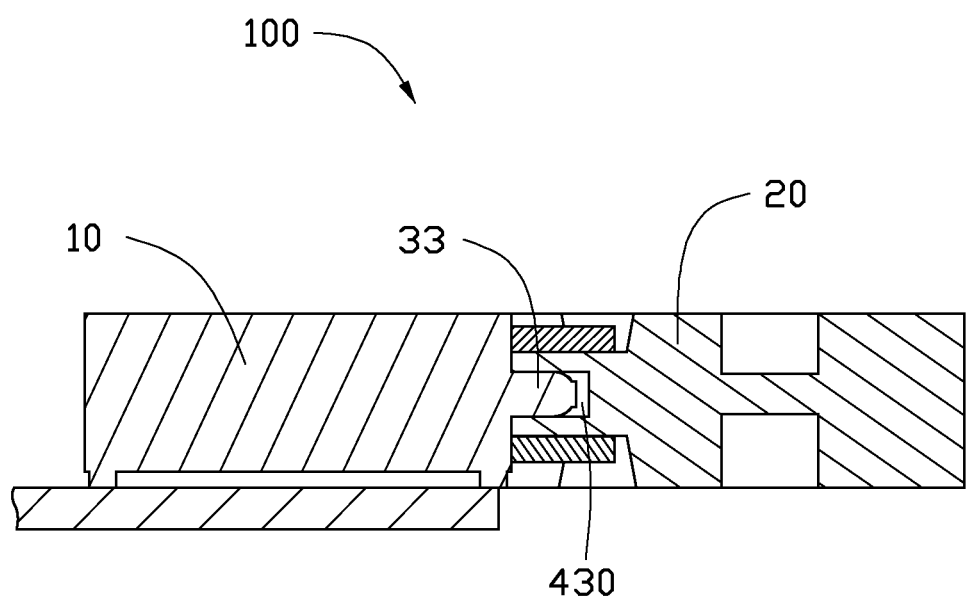
FIG. 11 is a cross-sectional view of the optical fiber coupling connector of FIG. 1, taken along the line XI-XI of FIG. 1.

FIGS. 3-4 and 10 show that the optical coupling module 30 includes a body portion 32, two locating posts 33, a support 34, four first converging lenses 35, four second converging lenses 36, four third converging lenses 37, and four fourth converging lenses 38.

The body portion 32 is substantially cubic. The body portion 32 includes a top surface 322, a bottom surface 324, a front surface 326, and a back surface 328. The top surface 322 and the bottom surface 324 are positioned at opposite sides of the body portion 32 and are substantially parallel to each other. The front surface 326 and the back surface 328 are positioned at opposite sides of the body portion 32 and are substantially parallel each other. The front surface 326 and the back surface 328 are substantially perpendicularly interconnected between the top surface 322 and the bottom surface 324.

The top surface 322 defines an elongated top recess 3220. The body portion 32 further includes a reflecting surface 3222, a first side surface 3224, and a second side surface 3226 in the top recess 3220. The reflecting surface 3222 is positioned at the bottom of the top recess 3220 and is inclined relative to the top surface 322. The first side surface 3224 connects the reflecting surface 3220 to the top surface 322. The second side surface 3226 connects the reflecting surface 3220 to the top surface 322. The first side surface 3224 is substantially parallel to and opposite to the second side surface 3226. The first side surface 3224 and the second side surface 3226 are substantially perpendicular to the top surface 322. In this embodiment, an included angle between a main plane of the reflecting surface 3222 and a main plane of the top surface 322 is about 45 degrees.

The bottom surface 324 defines a rectangular bottom recess 3240. The body portion 32 further includes a first optical surface 3242 in the bottom recess 3240. The first optical surface 3242 is positioned at a bottom of the bottom recess 3240 and is substantially parallel to the bottom surface 324. That is, an included angle between a main plane of the first optical surface 3242 and a main plane of the reflecting surface 33222 is about 45 degrees.

The front surface 326 defines a rectangular front recess 3260. The body portion 32 further includes a second optical surface 3262 in the front recess 3260. The second optical surface 3262 is positioned at the bottom of the front recess 3260 and is substantially parallel to the front surface 326. That is, an included angle between a main plane of the second optical surface 3262 and a main plane of the reflecting surface 3222 is about 45 degrees.

Figure 6:
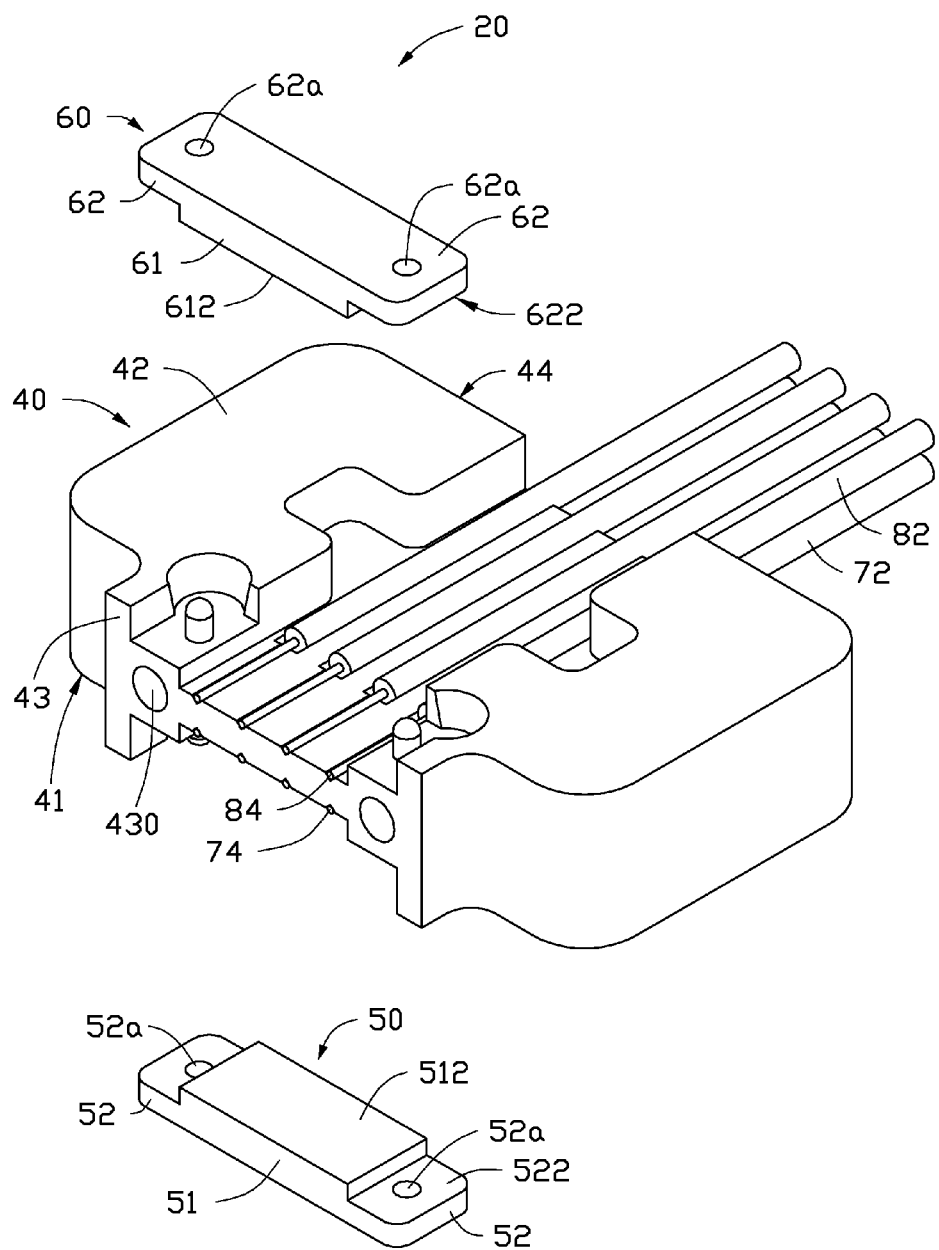
FIG. 6 is an exploded view of the optical fiber assembly of FIG. 5.

The two locating posts 33 extends substantially perpendicularly from the front surface 326 and are configured or engaging in respective engaging holes 430 (shown in FIG. 6) of the optical fiber assembly 20 (shown in FIG. 6). The front recess 3260 is located between the two locating posts 33, and the front recess 3260 and the two locating posts 33 are arranged collinearly.

The support 34 is substantially a rectangular ring. The support 34 perpendicularly extends from the bottom surface 324 and surrounds the bottom recess 3240. The support 34 is configured for adhering on the upper surface 122 of the circuit board 12 with adhesive agent when the optical coupling module 30 is assembled with the circuit board 12.

The four first converging lenses 35 and the four second converging lenses 36 are formed on the first optical surface 3242 and face the reflecting surface 3222. The four first converging lenses 35 are spaced from each other and are arranged in a third straight line which is parallel to the reflecting surface 3222. The four second converging lenses 36 are spaced from each other and are arranged in a fourth straight line which is parallel to the reflecting surface 3222. The third straight line partially or entirely overlaps the fourth straight line along a direction which is perpendicular to the third straight line. In this embodiment, the third straight line entirely overlaps the fourth straight line, and the first converging lenses 35 are aligned with the respective second converging lenses 36 in the direction which is perpendicular to the third straight line. Each of the first converging lenses 35 and the second converging lenses 36 is a convex lens.

The four third converging lenses 37 and the four fourth converging lenses 38 are formed on the second optical surface 3262 and face the reflecting surface 3222. The four third converging lenses 37 are spaced from each other and are arranged in a fifth straight line which is parallel to the reflecting surface 3222. The four fourth converging lenses 38 are spaced from each other and are arranged in a sixth straight line which is parallel to the reflecting surface 3222. That is, the third straight line, the fourth straight line, the fifth straight line, and the sixth straight line are parallel to each other. The third converging lenses 37 correspond to the first converging lenses 35 one-to-one, and the fourth converging lenses 38 correspond to the second converging lenses 36 one-to-one. The fifth straight line partially or entirely overlaps the sixth straight line along a direction which is perpendicular to the fifth straight line. In this embodiment, the fifth straight line entirely overlaps the sixth straight line, and the third converging lenses 37 are aligned with the respective fourth converging lenses 38 in the direction which is perpendicular to the fifth straight line. Each of the third converging lenses 37 and the fourth converging lenses 38 is a convex lens.

In this embodiment, the optical coupling module 30 is a single piece. That is, the body portion 32, the two locating posts 33, the support 34, the four first converging lenses 35, the four second converging lenses 36, the four third converging lenses 37, and the four fourth converging lenses 38 are formed into a unitary piece.

Figure 5:
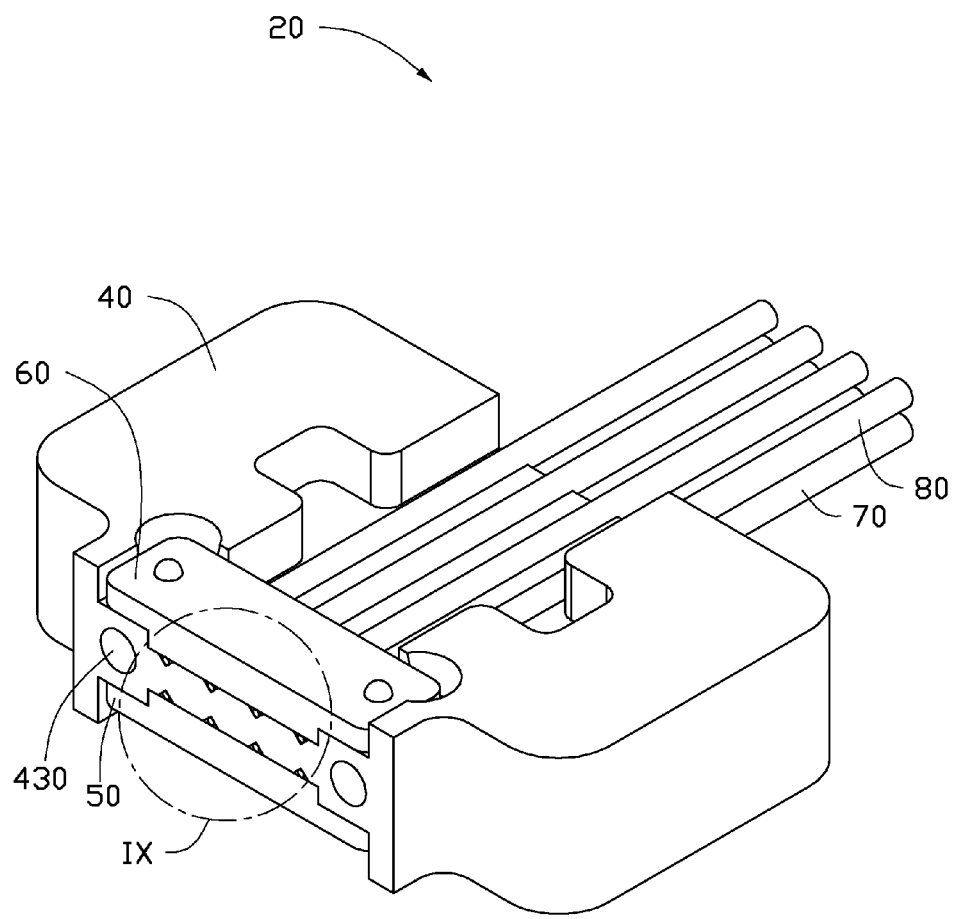
FIG. 5 is a schematic, isometric view of the optical fiber assembly of FIG. 1.

FIG. 5 shows that the optical fiber assembly 20 includes a main body 40, a first cover 50, a second cover 60, four first optical fibers 70, and four second optical fibers 80.

FIG. 6 shows that the main body 40 is substantially cubic. The main body 40 includes a first surface 41, a second surface 42, a third surface 43, and a fourth surface 44. The first surface 41 and the second surface 42 are positioned at opposite sides of the main body 40 and are substantially parallel to each other. The third surface 43 and the fourth surface 44 are positioned at opposite sides of the main body 40 and are substantially parallel to each other. The third surface 43 is perpendicularly interconnected between the first surface 41 and the second surface 42, and defines two engaging holes 430 corresponding to the two locating posts 33. The fourth surface 44 is perpendicularly interconnected between the first surface 41 and the second surface 42.

Figure 8:
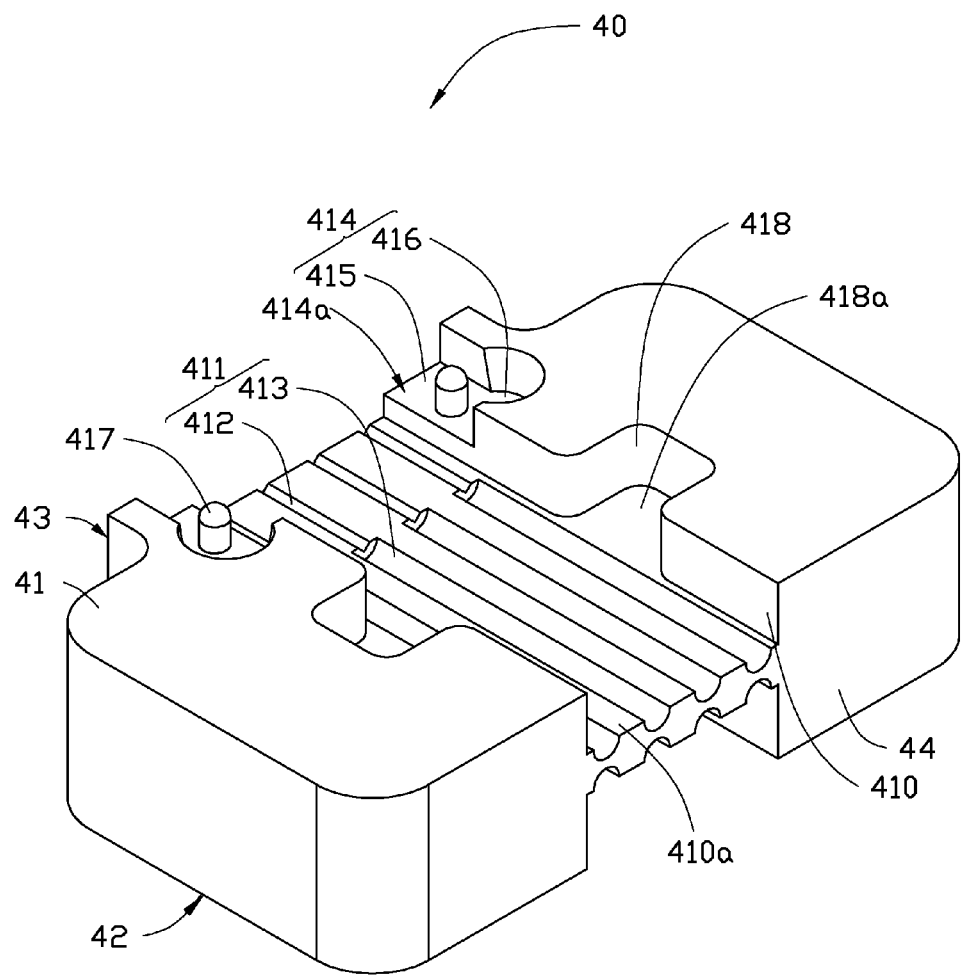
FIG. 8 is similar to FIG. 7, but viewed from another angle.

FIG. 8 shows that a first recess 410, two first receiving recesses 414, and two first extending recesses 418 are defined in the first surface 41.

Figure 9:
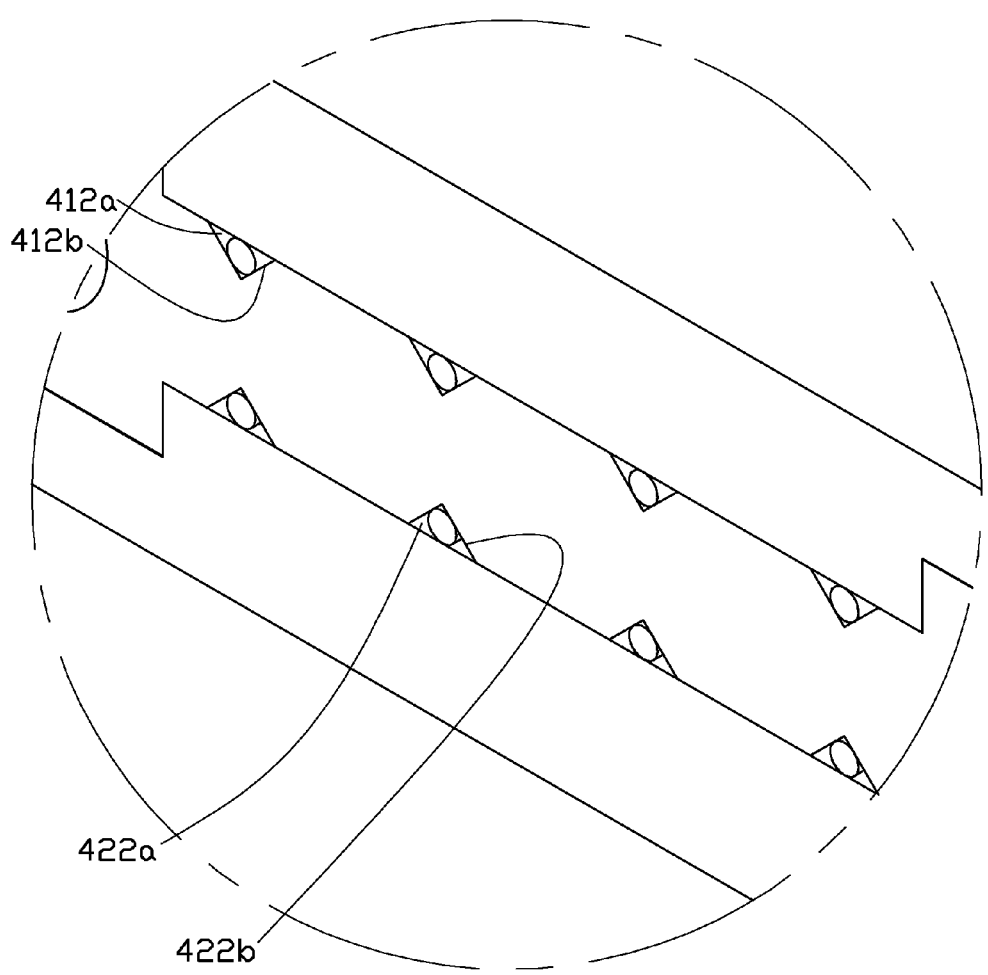
FIG. 9 is an enlarged view of section IX of the optical fiber assembly of FIG. 5.

The first recess 410 is substantially rectangular and passes through the third surface 43 and the fourth surface 44. The first recess 410 includes a first bottom surface 410a parallel to the first surface 41. The first bottom surface 410a defines four first receiving grooves 411 for receiving the four first optical fibers 70, which pass through the third surface 43 and the fourth surface 44. Each of the first receiving grooves 411 includes a first receiving groove portion 412 and a second receiving groove portion 413 communicating with the first receiving groove portion 412. The first receiving groove portion 412 and the second receiving groove portion 413 are arranged in that order from the third surface 43 to the fourth surface 44. In this embodiment, the first receiving groove portions 412 are substantially V-shaped in cross-section, and the second receiving groove portions 413 are substantially semicircular in cross-section. FIG. 9 shows that each of the first receiving groove portions 412 includes a first slanted surface 412a and a second slanted surface 412b obliquely connected to the first slanted surface 412a.

FIG. 8 shows that the two first receiving recesses 414 are arranged at opposite sides of the first recess 410 and communicate with the first recess 410. The first receiving recesses 414 are adjacent to the third surface 43. In this embodiment, the first receiving recesses 414 are symmetric with each other relative to the first recess 410, and each of the first receiving recesses 414 passes through the third surface 43. Each of the first receiving recesses 414 includes a second bottom surface 414a, a first cover receiving portion 415, and a first glue receiving portion 416 communicating with the first cover receiving portion 415. Each of the second bottom surfaces 414a is higher than the first bottom surface 410a. That is, the depth of each of the first receiving recesses 414 is less than the depth of the first recess 410. Each of the first cover receiving portions 415 is located between the corresponding first glue receiving portion 416 and the first recess 410. Two first posts 417 extend from the second bottom surface 414a in the first cover receiving portion 415. The first glue receiving portions 416 are configured for receiving two first glue layers.

The two first extending recesses 418 are arranged at opposite sides of the first recess 410 and communicate with the first recess 410. The first extending recesses 418 are substantially located in the middle portion of the first recess 410 along the longitudinal direction of the first recess 410. In this embodiment, the first extending recesses 418 are symmetric with each other relative to the first recess 410. A bottom surface 418a of each of the first extending recesses 418 is coplanar with the first bottom surface 410a. The first extending recesses 418 are configured for receiving two second glue layers.

Figure 7:
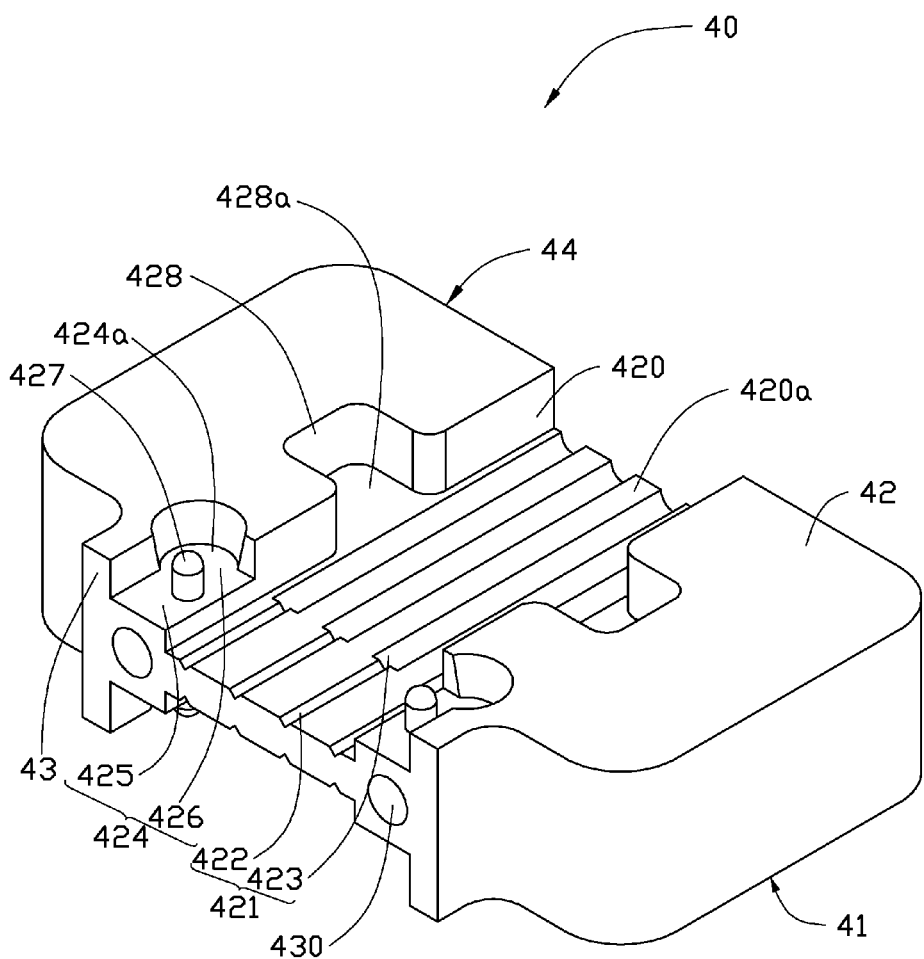
FIG. 7 is a schematic, isometric view of a main body of the optical fiber assembly of FIG. 5.

FIG. 7 shows that the structure of the second surface 42 is the same as that the first surface 41. In detail, a second recess 420, two second receiving recesses 424, and two second extending recesses 428 are defined in the second surface 42.

The second recess 420 is substantially rectangular and passes through the third surface 43 and the fourth surface 44. The second recess 420 includes a third bottom surface 420a parallel to the first surface 41. The third bottom surface 420a defines four second receiving grooves 421 receiving the four second optical fibers 80, which pass through the third surface 43 and the fourth surface 44. Each of the second receiving grooves 421 includes a third receiving groove portion 422 and a fourth receiving groove portion 423 communicating with the third receiving groove portion 422. The third receiving groove portion 422 and the fourth receiving groove portion 423 are arranged in that order from the third surface 43 to the fourth surface 44. In this embodiment, the third receiving groove portions 422 are substantially V-shaped in cross-section, and the fourth receiving groove portions 423 are substantially semicircular in cross-section. FIG. 9 shows that each of the third receiving groove portions 422 includes a third slanted surface 422a and a fourth slanted surface 422b. The third slanted surface 422a is obliquely connected to the fourth slanted surface 422b.

FIG. 8 shows that the two second receiving recesses 424 are arranged at opposite sides of the second recess 420 and communicate with the second recess 420. The second receiving recesses 424 are adjacent to the third surface 43. In this embodiment, the second receiving recesses 424 are symmetric with each other relative to the second recess 420, and each of the second receiving recesses 424 passes through the third surface 43. Each of the second receiving recesses 424 includes a fourth bottom surface 424a, a second cover receiving portion 425, and a second glue receiving portion 426 communicating with the second cover receiving portion 425. Each of the fourth bottom surfaces 424a is higher than the third bottom surface 420a. That is, the depth of each of the second receiving recesses 424 is smaller than that of the second recess 420. Each of the second cover receiving portions 425 is located between the corresponding second glue receiving portion 426 and the second recess 420. Two second posts 427 extend from the fourth bottom surface 424a in the second cover receiving portion 425. The second glue receiving portions 426 are configured for receiving two third glue layers.

The two second extending recesses 428 are arranged at opposite sides of the second recess 420 and communicate with the second recess 420. The second extending recesses 428 are substantially located in the middle portion of the second recess 420 along the longitudinal direction of the second recess 420. In this embodiment, the second extending recesses 428 are symmetric with each other relative to the second recess 420. A bottom surface 428a of each of the second extending recesses 428 is coplanar with the third bottom surface 420a. The second extending recesses 428 are configured for receiving fourth glue layers.

FIGS. 7 and 8 show that the two engaging holes 430 are apart from each other, and the first recess 410 and the second recess 420 are arranged between the two engaging holes 430.

FIG. 6 shows that the first cover 50 is shaped to be received in the first recess 410 and the two first cover receiving portions 415 with the first glue layers. The first cover 50 may be made of a material which does not impede ultraviolet light so that ultraviolet light can be used to cure all the first glue layers used. The insertion direction of the first cover 50 is substantially perpendicular to a longitudinal axis of each of the first receiving grooves 411.

In detail, the first cover 50 includes a first cover body 51 and two first flanges 52 extending from opposite sides of the first cover body 51. The first cover body 51 is substantially cubic and includes a first planar surface 512. Each first flange 52 includes a first engagement surface 522 and defines a first engagement hole 52a corresponding to the first post 417. Each first engagement hole 52a may be a blind hole or a through hole. In this embodiment, each first engagement hole 52a is a through hole.

The second cover 60 is shaped to be received in the second recess 420 and the two second cover receiving portions 425 with the third glue layers. The second cover 60 may be made of a material which does not impede ultraviolet light so that ultraviolet light can be used to cure all the third glue layers used. The insertion direction of the second cover 60 is substantially perpendicular to a longitudinal axis of each of the second receiving grooves 421.

The structure of the second cover 60 is the same as the structure of the first cover 50. In detail, the second cover 60 includes a second cover body 61 and two second flanges 62 extending from opposite sides of the second cover body 61. The second cover body 61 is substantially cubic and includes a second planar surface 612. Each of the second flanges 62 includes a second engagement surface 622 and defines a second engagement hole 62a corresponding to the second post 427. Each of he second engagement hole 62a may be a blind hole or a through hole. In this embodiment, each of the second engagement hole 62a is a through hole.

FIGS. 5-6 and 10 show that the first optical fibers 70 are received in the respective first receiving grooves 411. Each of the first optical fibers 70 includes a first main portion 72 which is substantially circular in cross-section, and a concentric first front portion 74. The first main portion 72 consists of a core portion and a cladding portion surrounding the core portion. The first front portion 74 consists of the core portion exposed, and the first front portion 74 has a certain critical length. Each of the first receiving groove portions 412 is sized to match the first front portion 74 and is configured for receiving the first front portion 74. Each of the second receiving groove portions 413 conforms to the first main portion 72 and is configured for receiving the first main portion 72.

The second optical fibers 80 are received in the respective second receiving grooves 421. Each of the second optical fibers 80 includes a second main portion 82 which is substantially circular in cross-section, and a concentric second front portion 84. The second main portion 82 consists of a core portion and a cladding portion surrounding the core portion. The second front portion 84 consists of the core portion exposed, and the second front portion 84 has a certain critical length. Each of the third receiving groove portions 422 is sized to match the second front portion 84 and is configured for receiving the second front portion 84. Each of the fourth receiving groove portions 423 conforms to the second main portion 82 and is configured for receiving the second main portion 82.

FIGS. 5-9 show that when the first optical fibers 70 are fixed in the first recess 410, first, the first optical fibers 70 are placed in the respective first receiving grooves 411 from top to bottom. Each of the first front portions 84 is received in the corresponding first receiving groove portion 412, and each of the first main portions 82 is received in the corresponding second receiving groove portion 413. Second, the first cover 50 is inserted into the main body 40. The first flanges 52 are received in the respective first receiving recesses 414, and the first cover body 51 is received in the first recess 410. In detail, the first posts 417 engage in the respective first engagement holes 52a, each of the first engagement surfaces 522 contacts the corresponding second bottom surface 414a, and the first planar surface 512, the first slanted surface 412a, and the second slanted surface 412b cooperatively and securely retain the first front portion 74 of each of the first optical fibers 70 in the corresponding first receiving groove portion 412. That is, the outer surface of the first front portion 74 is in contact with the first planar surface 512. Third, the first glue layers are dispersed on the first cover 50, thereby the first cover 50 is fixed in place. Fourth, the second glue layers are dispersed on the first main portions 72, thereby the first main portions 72 are fixed in the second receiving groove portions 413. Thus the first optical fibers 70 are fixed in the first recess 110. During the process, inserting the first optical fibers 70 into blind holes is avoided; thereby the first optical fibers 70 can be easily and safely fixed in the main body 40. In addition, if the first glue layers and the second glue layers are excessive, the excess of the first glue layers flows into the first glue receiving portions 416, and the excess of the second glue layers flows into the first extending recesses 418.

When the second optical fibers 80 are fixed in the second recess 420, first, the second optical fibers 80 are placed in the respective second receiving grooves 421 from top to bottom. In particularly, each of the second front portions 84 is received in the corresponding third receiving groove portion 422, and each of the second main portions 82 is received in the corresponding fourth receiving groove portion 423. Second, the second cover 60 is inserted into the main body 40. The second flanges 62 are received in the respective second receiving recesses 424, and the second cover body 61 is received in the second recess 420. In detail, the second post 427 engages in the respective second engagement hole 62a, each of the second engagement surface 622 contacts the corresponding fourth bottom surface 424a, and the second planar surface 612, the third slanted surface 422a, and the fourth slanted surface 422b cooperatively and securely retain the second front portion 84 of each of the second optical fibers 80 in the corresponding third receiving groove portion 422. That is, the outer surface of the second front portion 84 is in contact with the second planar surface 612. Third, the third glue layers are dispersed on the second cover 60, thereby the second cover 60 is fixed in place. Fourth, the fourth glue layers are dispersed on the second main portions 82, thereby the second main portions 82 are fixed in the fourth receiving groove portions 423. Thus the second optical fibers 80 are fixed in the second recess 420. The process of inserting the second optical fibers 80 into blind holes is avoided; thereby the second optical fibers 80 can be easily and safely fixed in the main body 40. In addition, if the third glue layers and the fourth glue layers are excessive, the excess of the third glue layers flows into the second glue receiving portions 426, and the excess of the fourth glue layers flows into the second extending recesses 428.

FIGS. 1-5 and 10-11 show that when the optical fiber coupling connector 100 is assembled, first, the support 34 is attached on the upper surface 122. The four light-emitting modules 14 are aligned with the four first converging lenses 35, and the four light-receiving modules 16 are aligned with the four second converging lenses 36. That is, the first straight line, the second straight line, the third straight line, the fourth straight line, the fifth straight line, and the sixth straight line are parallel to each other. The first straight line entirely overlaps the second straight line along a direction which is perpendicular to the first straight line. Second, glue is applied to the sidewalls of the support 34, thereby adhering the optical coupling module 30 to the circuit board 12. Third, the two locating posts 33 engage in the respective engaging holes 340, thereby the optical fiber assembly 20 is inserted into the photoelectric conversion device 10. In this situation, the third converging lenses 37 are aligned with the first optical fibers 70, and the fourth converging lenses 38 are aligned with the second optical fibers 80.

FIG. 10 shows that when the optical fiber coupling connector 100 is in use, electric power is first applied to the light-emitting modules 14 through the circuit board 12. Light beams emitting from the light-emitting modules 14 pass through the corresponding first converging lenses 35 and become parallel light beams. The parallel light beams are reflected by the reflecting surface 3222 toward the corresponding third converging lenses 37, and converged by the corresponding third converging lenses 37 to the corresponding first optical fibers 70. Then, electric power is applied to the light-receiving modules 16 through the circuit board 12. Light beams from the second optical fibers 80 pass through the fourth converging lenses 38 and become parallel light beams. The parallel light beams are reflected by the reflecting surface 3222 toward the corresponding second converging lenses 36, and are converged by the corresponding second converging lenses 36 to the corresponding light-receiving modules 16. The light-receiving modules 16 convert the optical signals to electric signals.

In the optical fiber coupling connector 100, the light-emitting modules 14, the first converging lenses 35, the third converging lenses 37, and the first optical fiber 70 form a number of first type of light paths, and the second optical fibers 80, the fourth converging lenses 38, the second converging lenses 36, and the light-receiving modules 16 form a number of second type of light paths. In order to increase the total light path, the light-emitting module 14, the light-receiving module 16, the first converging lens 35, the second converging lens 36, the third converging lens 37, and the fourth converging lens 38 can be increased along a direction which is perpendicular to the first straight line, and the dimensions of the optical fiber coupling connector 100 can be maintained.

Even though numerous characteristics and advantages of the present embodiments have been set forth in the foregoing description, together with details of the structures and functions of the embodiments, the disclosure is illustrative only, and changes may be made in detail, especially in the matters of shape, size, and the arrangement of parts within the principles of the disclosure to the full extent indicated by the broad general meaning of the terms in which the appended claims are expressed.

What is claimed is:

1. A photoelectric conversion device comprising:
   a circuit board;
   a plurality of light-emitting modules arranged on the circuit board in a first straight line and spaced apart from each other;
   a plurality of light-receiving modules arranged on the circuit board in a second straight line and spaced apart from each other; and an optical coupling module comprising a first optical surface, a second optical surface perpendicular to the first optical surface, a reflecting surface obliquely relative to the first optical surface and the second optical surface, a plurality of first converging lenses arranged on the first optical surface in a third straight line, a plurality of second converging lenses arranged on the first optical surface in a fourth straight line, a plurality of third converging lenses arranged on the second optical surface in a fifth straight line, and a plurality of fourth converging lenses arranged on the second optical surface in a sixth straight line, the first straight line, the second straight line, the third straight line, the fourth straight line, the fifth straight line, and the sixth straight line being substantially parallel to each other, the first converging lenses aligned with the light-emitting modules and corresponding to the third converging lenses, the second converging lenses aligned with the light-receiving modules and corresponding to the fourth converging lenses, the reflecting surface configured for reflecting light beams from the first converging lenses toward the corresponding third converging lenses and for reflecting light beams from the fourth converging lenses toward the second converging lenses.

2. The photoelectric conversion device as claimed in claim 1, wherein the first straight line entirely overlaps the second straight line along a direction perpendicular to the first straight line, the third straight line entirely overlaps the fourth straight line along a direction perpendicular to the third straight line, and the fifth straight line entirely overlaps the sixth straight line along a direction perpendicular to the fifth straight line.

3. The photoelectric conversion device as claimed in claim 2, wherein the optical coupling module further comprises a body portion, the body portion comprises a top surface, a bottom surface opposite to and parallel to the top surface, a front surface, and a back surface opposite to and parallel to the front surface, the front surface and the back surface are interconnected between the top surface and the bottom surface, the top surface defines a top recess, the reflecting surface is positioned at the bottom of the top recess, the bottom surface defines a bottom recess, the first optical surface is positioned at the bottom of the bottom recess, the front surface defines a front recess, and the second optical surface is positioned at the bottom of the front recess.

4. The photoelectric conversion device as claimed in claim 3, wherein an included angle between a main plane of the first optical surface and a main plane of the reflecting surface is about 45 degrees, and an included angle between a main plane of the second optical surface and a main plane of the reflecting surface is about 45 degrees.

5. The photoelectric conversion device as claimed in claim 3, wherein the body portion further comprises a first side surface and a second side surface in the top recess, the first side surface is opposite to the second side surface, the first side surface is perpendicularly connected to the top surface, the second side surface is perpendicularly connected to the top surface, and the reflecting surface is obliquely interconnected between the first side surface and the second side surface.

6. The photoelectric conversion device as claimed in claim 5, further comprising a support extending from the bottom surface and surrounding the bottom recess.

7. The photoelectric conversion device as claimed in claim 5, further comprising two locating posts extending from the front surface, wherein the front recess is located between the two locating posts.

8. An optical fiber coupling connector comprising:
a photoelectric conversion device comprising:
   a circuit board;
   a plurality of light-emitting modules arranged on the circuit board in a first straight line and spaced apart from each other;
   a plurality of light-receiving modules arranged on the circuit board in a second straight line and spaced apart from each other; and
   an optical coupling module comprising a first optical surface, a second optical surface perpendicular to the first optical surface, a reflecting surface obliquely relative to the first optical surface and the second optical surface, a plurality of first converging lenses arranged on the first optical surface in a third straight line, a plurality of second converging lenses arranged on the first optical surface in a fourth straight line, a plurality of third converging lenses arranged on the second optical surface in a fifth straight line, and a plurality of fourth converging lenses arranged on the second optical surface in a sixth straight line, the first straight line, the second straight line, the third straight line, the fourth straight line, the fifth straight line, and the sixth straight line being substantially parallel to each other, the first converging lenses aligned with the light-emitting modules and corresponding to the third converging lenses, the second converging lenses aligned with the light-receiving modules and corresponding to the fourth converging lenses, the reflecting surface configured for reflecting light beams from the first converging lenses toward the corresponding third converging lenses and for reflecting light beams from the fourth converging lenses toward the second converging lenses; and
an optical fiber assembly comprising a plurality of first optical fibers and a plurality of second optical fibers, the first optical fibers aligned with the respective third converging lenses, and the second optical fibers aligned with the respective fourth converging lenses.

9. The optical fiber coupling connector as claimed in claim 8, wherein the first straight line entirely overlaps the second straight line along a direction perpendicular to the first straight line, the third straight line entirely overlaps the fourth straight line along a direction perpendicular to the third straight line, and the fifth straight line entirely overlaps the sixth straight line along a direction perpendicular to the fifth straight line.

10. The optical fiber coupling connector as claimed in claim 9, wherein the optical coupling module further comprises a body portion, the body portion comprises a top surface, a bottom surface opposite to and parallel to the top surface, a front surface, and a back surface opposite to and parallel to the front surface, the front surface and the back surface are interconnected between the top surface and the bottom surface, the top surface defines a top recess, the reflecting surface is positioned at the bottom of the top recess, the bottom surface defines a bottom recess, the first optical surface is positioned at the bottom of the bottom recess, the front surface defines a front recess, and the second optical surface is positioned at the bottom of the front recess.

11. The optical fiber coupling connector as claimed in claim 10, wherein an included angle between a main plane of the first optical surface and a main plane of the reflecting surface is about 45 degrees, and an included angle between a main plane of the second optical surface and a main plane of the reflecting surface is about 45 degrees.

12. The optical fiber coupling connector as claimed in claim 10, wherein the body portion further comprises a first side surface and a second side surface in the top recess, the first side surface is opposite to the second side surface, the first side surface is perpendicularly connected to the top surface, the second side surface is perpendicularly connected to the top surface, and the reflecting surface is obliquely interconnected between the first side surface and the second side surface.

13. The optical fiber coupling connector as claimed in claim 12, wherein the photoelectric conversion device further comprises a support extending from the bottom surface and surrounding the bottom recess.

14. The optical fiber coupling connector as claimed in claim 12, wherein the photoelectric conversion device further comprises two locating posts extending from the front surface, and the front recess is located between the two locating posts.

15. The optical fiber coupling connector as claimed in claim 14, wherein the optical fiber assembly further comprises a main body, a first cover, and a second cover, the main body comprises a first surface and a second surface opposite to the first surface, the first surface defines a first recess, the second surface defines a second recess, the first cover presses the first optical fibers in the first recess, and the second cover presses the second optical fibers in the second recess.

* * * * *